UNITED STATES PATENT OFFICE.

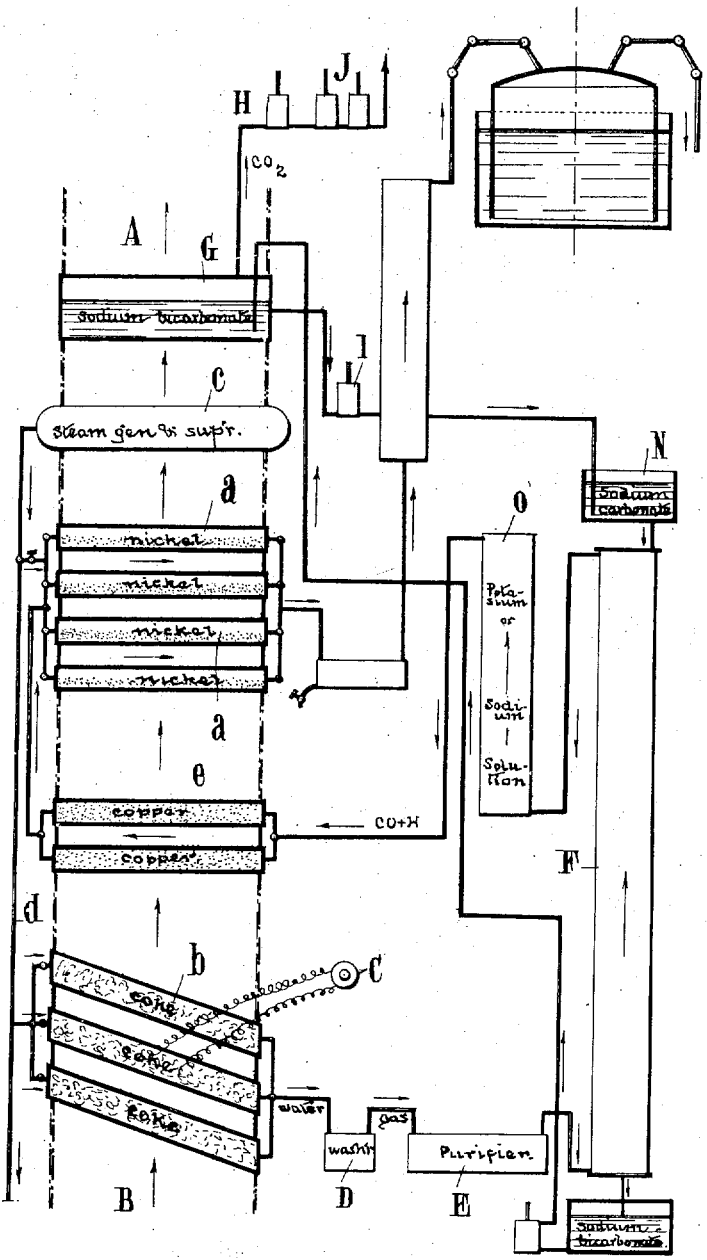

PAUL SABATIER, OF TOULOUSE, FRANCE.

PROCESS OF MANUFACTURING METHANE OR OF MIXTURES OF METHANE AND HYDROGEN.

956,734.   Specification of Letters Patent.   Patented May 3, 1910.

Application filed August 11, 1908. Serial No. 448,058.

*To all whom it may concern:*

Be it known that I, PAUL SABATIER, resident of Toulouse, France, a citizen of the Republic of France, have invented a new and useful Improvement in and Relating to the Process of Manufacturing Methane or of Mixtures of Methane and Hydrogen, which improvement is fully set forth in the following specification.

The present invention relates to a process for the manufacture of methane or of mixtures of methane and hydrogen by passing water gas over heated nickel.

The manufacture of methane or of mixtures of methane and hydrogen was effected hitherto by producing water gas in some suitable manner, by depriving such water gas of carbonic anhydrid with the aid of an alkaline carbonate and by finally passing the gas over heated nickel. This process has never produced good practical results on account of the following reasons:—1. The water gas constantly varies in composition and as the whole operation is based on a definite composition of the gas, the process soon becomes defective, the production of hydrogen becomes insufficient, the nickel is carbonized and after a short time the operation has to be stopped. 2. The carbonized nickel has to be regenerated and an operation of the kind requires time and expense. Either two apparatus have to be used or else the carbonized nickel must be removed and replaced by a fresh quantity.

Attempts have been made to avoid the deposit of carbon on and between the particles of nickel by adding steam to the water gas. This process is costly however owing to the auxiliary production of steam; moreover it has never produced satisfactory results, as the exact composition of the mixture of gases was not known.

By using the process which constitutes the present invention all these disadvantages may be avoided and the operation may be carried out in a regular manner without any interruptions.

My invention is characterized by the fact that the water gas used has a constant composition which is obtained by observing a constant temperature in the apparatus for producing such gas. The water gas is subsequently deprived of carbonic acid in two stages; it is treated first of all with sodium carbonate in a known manner and is afterward passed through a dilute solution of sodium hydrate. In this double operation for removing the carbonic acid, the gas becomes sufficiently moist so that it can be passed on to the nickel without adding water vapor. No carbon is deposited in this process a mixture of gases is obtained that always contains the same proportions of methane and hydrogen.

In the accompanying drawing, an apparatus is shown, by way of example, suitable for the purpose of carrying out my process.

*I. The manufacture of water gas of a definite composition.*—The water gas is manufactured in apparatus A with bent tubes or straight horizontal or inclined tubes $b$ as shown in the drawings by way of an example. The super heated steam produced in the generator $c$ passes through $d$ to the coke (anthracite, wood, charcoal), the latter being heated by a furnace B heated with coal, or preferably by the gases produced by a Siemens or an analogous generator. A pyrometer C with constant indications such as Lechatelier's thermo-electric pyrometer will allow of the average temperature in the tubes $b$ being determined. The pyrometer is fixed at the angle of the bent tubes or in the middle of the straight tubes.

The composition of the water gas depends: 1. On the temperature of the coal. 2. On the nature of the coal. The higher the temperature the smaller the proportion of carbonic acid. The amount of carbonic acid contained in the gases can easily be determined. If this amount is about 20 per cent. the gas is just in condition for the manufacture of pure methane. A reading is taken with the pyrometer and it is sufficient to keep the temperature at the degree it has attained. If the proportion of carbonic acid gas is lower than 20 per cent., the furnace is too hot and the heating must be regulated so as to attain the proportion required. If a mixture of methane and hydrogen is to be prepared the temperature must be lowered until the pyrometer shows a temperature that corresponds to the proper proportion of carbonic acid gas. In a furnace fed with light coke the proportion of 20 per cent. of carbonic acid corresponds to 970° read off the pyrometer. At 780° 24 per cent. of carbonic acid is obtained and 12 per cent. of carbon monoxid. This mixture ought to yield about 33 per cent. methane and 67 per cent. hydrogen. The water gas prepared in this manner is washed at D and cleaned at E with a Laming mixture before being deprived of carbonic acid gas. When ordinary gas for lighting purposes and methane are to be prepared simultaneously the retorts of the gas factory may be used for generating water gas by introducing water vapor before the glowing coal is removed, such water vapor being afterward transformed into methane.

*II. Removal of the carbonic acid.*—The gas to be deprived of carbonic acid is passed in at the bottom of a vertical column F in which a sodium carbonate flows down. The liquid that runs out contains of course sodium bicarbonate. The same is passed into boilers G that are heated with the hot gases that come out of the water gas furnace. In these boilers carbonic acid gas is given off. The production of carbonic gas by the decomposition of the bicarbonate may be facilitated by aspirating with a pump H. The liquid that finally contains the neutral carbonate only is brought back to the column F by suitable pumps I and the whole operation is started over again. The carbonic acid gas cannot however be completely removed in this manner owing to high tension of the dissociation of the bicarbonate, especially at the temperatures that supervene in summer. The removal of the carbonic acid is completed by passing the gas through a small column O in which a dilute solution of potassium or sodium hydrate is made to circulate or by passing the gas through chambers in which a layer of slaked lime is spread out. If potassium hydrate is used or sodium hydrate this material is recuperated from time to time by heating the same with lime. In the case of potassium the resulting carbonate of lime retains a little potassium hydrate and may subsequently be made use of in agriculture as a fertilizer. The carbonic acid that escapes from the boilers G may be liquefied at J by compression in a known manner and may be placed on the market as liquid carbonic acid.

*III. The reaction in the nickel tubes.*—The practical execution of this reaction depends on the following conditions: 1. The initial cleaning of the gas. 2. The arrangement of the apparatus. 3. The preparation of the nickel. 4. The way of conducting the operation.

1. The gas deprived of carbon dioxid at O consists of a mixture of carbon monoxid and hydrogen. It must be freed from traces of sulfur compounds that it may contain and for this purpose the gas is made to pass through tubes e containing copper in the shape of turnings or of a fine powder. These tubes are built into water gas furnace A B above the carbon tubes and must be maintained at a temperature between 500° and 600° C. The copper heated to dark red withholds any impurities that might deteriorate the nickel. After long use the copper becomes partly transformed into copper sulfid and must be renewed. The copper sulfid may be submitted to a roasting process so as to obtain copper oxid and the latter may be restored to metallic copper by treating the oxid with the gas to be purified.

2. The apparatus for the reaction with nickel consists of horizontal metallic flattened tubes a into which flat repectacles containing nickel are introduced. These tubes are arranged in series in furnaces that are heated by the hot gases of the water gas furnace. The temperature may be controlled by thermometers or by means of pyrometers that indicate continuously. Vertical cylinders may likewise be used that are supplied with horizontal plates on which the nickel is placed, the gases being made to circulate around these plates. The hot gases of the water gas furnace are made to heat successively after heating the carbon tubes b, the tubes e provided with copper, the tubes a or the horizontal plates for producing hydrogen and finally the boilers G for decomposing the sodium bicarbonate.

3. The nickel producing the catalytic reaction must be in a powdered condition and is obtained by reducing the nickel oxid to be had in the trade. The reduction may be effected in the same apparatus that is used for carrying out the present invention. The oxid is reduced by applying the mixture of carbon monoxid and hydrogen that issues from the copper tubes. The reduction ought to be effected between 350 and 450° C.

4. The tubes (or flat cylinders) for the nickel are grouped in several series that are independent of one another, so that one series may be emptied, filled again and reduced without interrupting the whole operation.

5. The reaction with nickel is effected preferably at 350° C., but the temperature may vary between 300 and 450° C. without involving any serious disadvantage. As the gases are moist when they reach the nickel and the reaction is accompanied by a considerable production of water, the permanent formation of carbon on the nickel according to the reaction $2CO = C + CO_2$ does not take place. This may easily be verified by examining the gas after leaving the apparatus. The same will be found to contain no appreciable quantities of carbonic acid.

Having now particularly described and ascertained the nature of my said invention and in what manner the same is to be performed, I declare that what I claim is:—

1. The process of making methane consisting in passing steam over carbon confined in a retort maintained at a constant temperature to produce water-gas of constant composition, then removing the carbon dioxid from the resulting gaseous product and passing the carbon dioxid free gases over heated nickel, for the purpose described.

2. The process of making methane consisting in passing steam over carbon confined in retorts maintained at a temperature of about 970° C., to produce water gas of constant composition, then removing the carbon dioxid from the resulting gaseous product and passing the carbon dioxid free gases over heated nickel, for the purpose described.

3. The process of making methane consisting in passing steam over carbon confined in retorts maintained at a temperature to produce water gas of constant composition, then passing the resulting gases first through an alkali carbonate solution to remove the greater part of the carbon dioxid, and then through an alkali hydrate solution to remove the remainder of the carbon dioxid, and finally passing the carbon dioxid free gases over heated nickel, for the purpose described.

4. The process of making methane consisting in passing steam over carbon confined in retorts maintained at a constant temperature to produce water gas of a constant composition, freeing the resulting gaseous product of carbon dioxid and sulfur compounds by passing the gases in contact with an alkali carbonate solution to remove the larger part of the carbon dioxid, then in an alkali hydrate to remove the remainder of the same, then over heated copper to remove the sulfur, and finally passing the purified gases over heated nickel, for the purpose described.

In testimony whereof I have signed this specification in the presence of two subscribing witnesses.

PAUL SABATIER.

Witnesses:
ALBERT PHILLIPS,
H. PHILLIPS.